United States Patent
Wendlandt et al.

[11] Patent Number: 5,861,631
[45] Date of Patent: Jan. 19, 1999

[54] STORAGE PHOSPHOR CASSETTE WITH IMPROVED DURABILITY

[75] Inventors: William C. Wendlandt, Rochester; William F. Snyder, Hilton, both of N.Y.

[73] Assignee: Eastman Kodak Company, Rochester, N.Y.

[21] Appl. No.: 862,228

[22] Filed: May 23, 1997

[51] Int. Cl.$^6$ .................................................. G03B 42/04
[52] U.S. Cl. .................................... 250/484.4; 250/485.1
[58] Field of Search .............................. 250/484.4, 485.1, 250/581

[56] References Cited

U.S. PATENT DOCUMENTS

| | | | |
|---|---|---|---|
| 4,511,802 | 4/1985 | Teraoka | 250/484.4 |
| 4,665,003 | 5/1987 | Matsuda et al. | 250/484.4 X |
| 4,827,136 | 5/1989 | Bishop, Jr. et al. | |
| 5,065,866 | 11/1991 | Boutet et al. | |
| 5,090,567 | 2/1992 | Boutet | |
| 5,276,333 | 1/1994 | Robertson | |
| 5,310,059 | 5/1994 | Robertson | |
| 5,519,229 | 5/1996 | Verbeke et al. | |
| 5,576,552 | 11/1996 | Rantanen | 250/484.4 |

FOREIGN PATENT DOCUMENTS 0 394 564  6/1994  European Pat. Off. .

*Primary Examiner*—Edward J. Glick
*Attorney, Agent, or Firm*—William F. Noval

[57] ABSTRACT

A storage phosphor cassette comprising a shell including upper and lower rectangular panels, first and second side members, and a front end member, the side members and the front end member joining the upper and lower panels to form a five sided cavity having an open end; wherein the lower panel includes a segment at the open end, the segment formed of folded over stainless steel having latch cars cut into the front edge thereof; a storage phosphor assembly including a back end member, an insert plate having an upper face and being cantilevered from the back end member, and an x-ray storage phosphor disposed on the upper face of the insert plate, wherein the storage phosphor assembly is removably contained in the shell such that the back end member closes off the open end of the shell; wherein the insert plate is rectangular with front, back, and side edges, and is formed of a rigid composite having upper and lower aluminum skins and an aluminum honeycomb core, the core having recesses along the front, back, and side edges; wherein the back end member extends into the back recess, the composite being secured to the back end member; wherein the insert plate includes side inserts which are secured in the side recesses of the composite, which are interlocked at their back ends with the back end member, and which extend slightly beyond the upper and lower skins of the composite to form a bumper system to absorb and distribute forces away from the composite to the back end member, and further includes a front insert secured in the front recess of the composite.

3 Claims, 9 Drawing Sheets

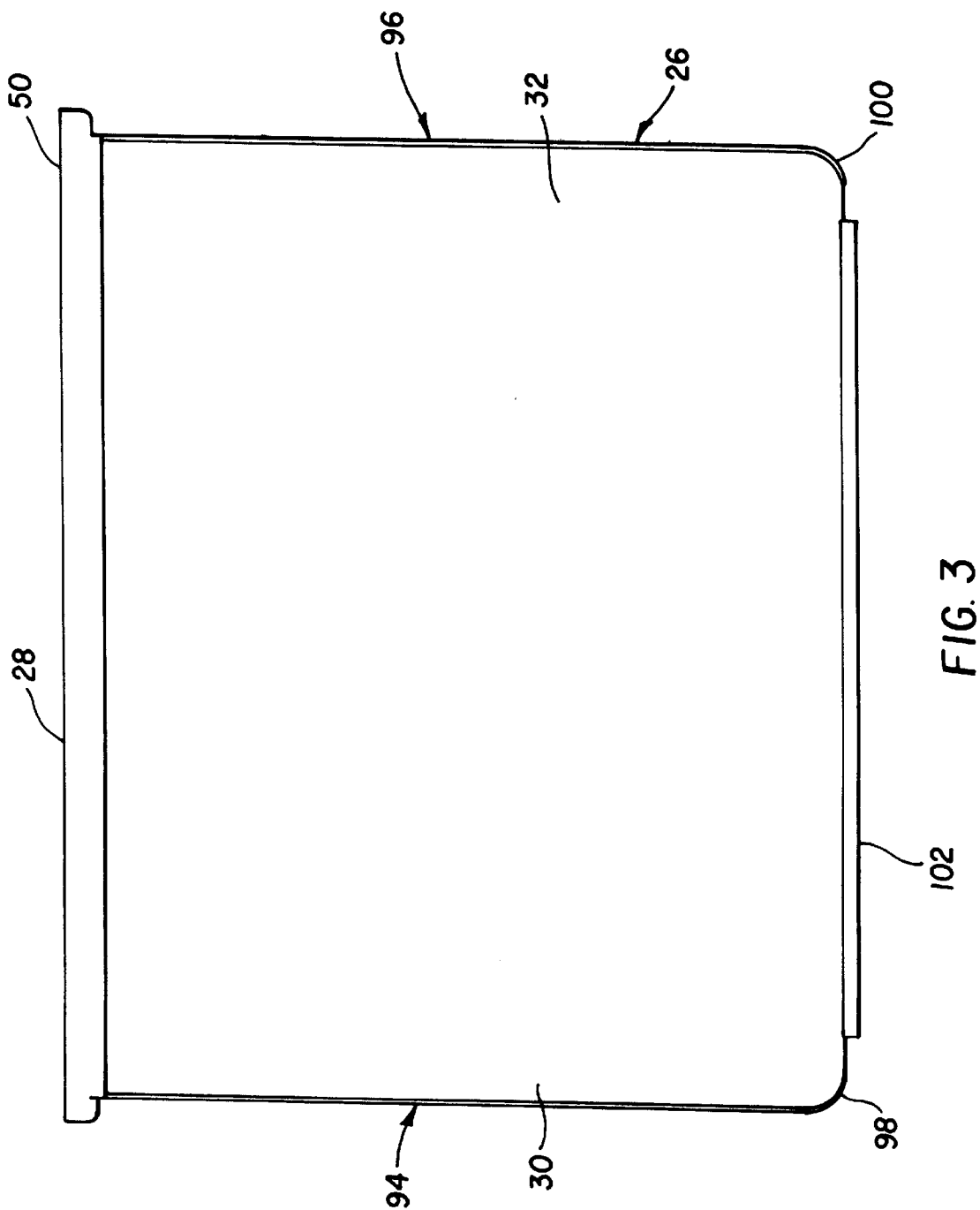

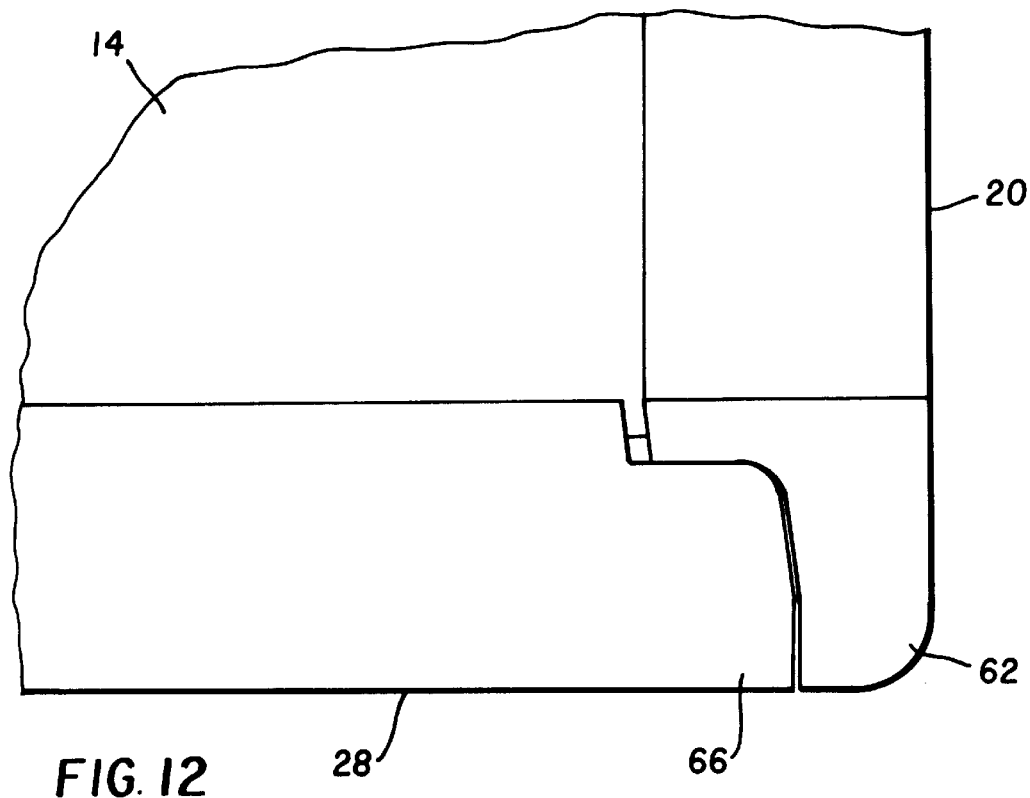
FIG. 12
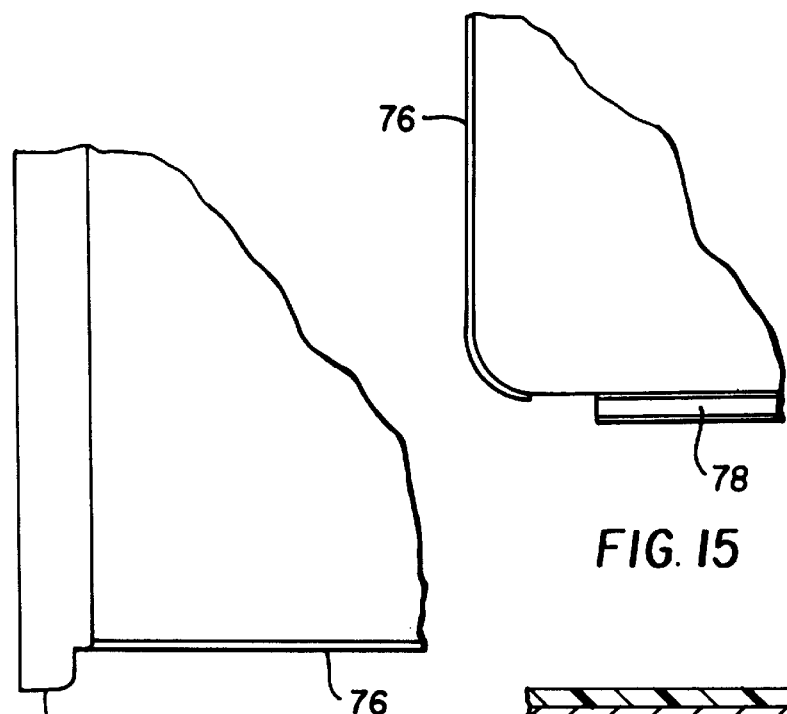
FIG. 14
FIG. 15
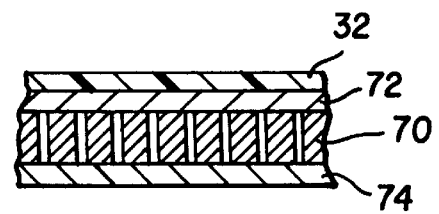
FIG. 16

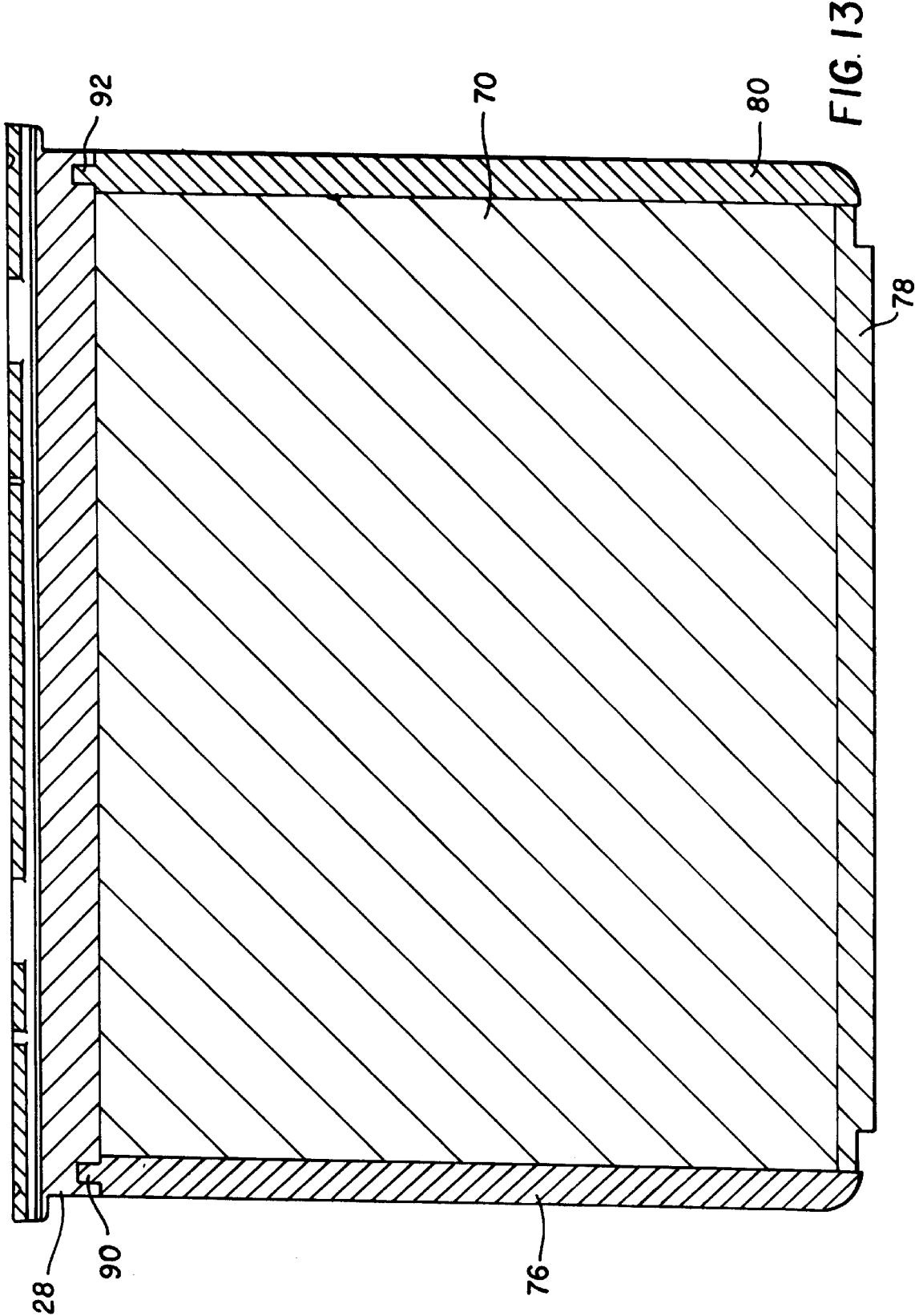

5,861,631

STORAGE PHOSPHOR CASSETTE WITH IMPROVED DURABILITY

FIELD OF THE INVENTION

The invention relates generally to cassettes for photographic elements and, more particularly, to a cassette for an x-ray phosphor film plate of the kind used in computed radiography.

BACKGROUND OF THE INVENTION

In computed radiography, a photographic element has an image formed thereon by x-rays, and the element is subsequently provided to a reader where the photographic element is stimulated to emit a radiation pattern that is captured for storage and use. Cassettes of the kind used in computed radiography may comprise a container having upper and lower parts that are hinged together so that they can be opened for insertion of a thin, flexible film sheet or rigid film plate comprising the photographic element. The cassette is closed and latched so that the cassette with the element therein can be used with an x-ray apparatus to produce an image on the photographic element. Then the cassette is taken to a reader where the cassette must be opened and the photographic element extracted by suitable feeders, such as suction feeding devices. The photographic element separate from the cassette is transported through the reader where it is stimulated to emit a radiation pattern and subsequently erased before being returned to the cassette for re-use.

The cassettes and the photographic elements as described above have generally been satisfactory, however, the cassettes are susceptible to various types of damage when dropped or handled roughly. Accordingly, it is desirable to increase the durability of the cassette, while minimizing cost, and preserving the same basic nature of design.

The following patents disclose various types of cassettes which do not solve these problems: U.S. Pat. No. 5,276,333; U.S. Pat. No. 5,310,059; U.S. Pat. No. 5,065,866; U.S. Pat. No. 5,090,567; U.S. Pat. No. 4,827,136; EP Patent 0394564; and U.S. Pat. No. 5,519,229.

SUMMARY OF THE INVENTION

According to the present invention, there is provided a solution to the problems discussed above.

According to an aspect of the present invention, there is provided a storage phosphor cassette comprising a shell including upper and lower rectangular panels, first and second side members, and a front end member, the side members and the front end member joining the upper and lower panels to form a five sided cavity having an open end; wherein the lower panel includes a segment at the open end, the segment formed of folded over stainless steel having latch ears cut into the front edge thereof; a storage phosphor assembly including a back end member, an insert plate having an upper face and being cantilevered from the back end member, and an x-ray storage phosphor disposed on the upper face of the insert plate, wherein the storage phosphor assembly is removably contained in the shell such that the back end member closes off the open end of the shell; wherein the insert plate is rectangular with front, back, and side edges, and is formed of a rigid composite having upper and lower aluminum skins and an aluminum honeycomb core, the core having recesses along the front, back, and side edges; wherein the back end member extends into the back recess, the composite being secured to the back end member; wherein the insert plate includes side inserts which are secured in the side recesses of the composite, which are interlocked at their back ends with the back end member, and which extend slightly beyond the upper and lower skins of the composite to form a bumper system to absorb and distribute forces away from the composite to the back end member, and further includes a front insert secured in the front recess of the composite.

ADVANTAGEOUS EFFECT

The present invention provides a storage phosphor cassette which has increased durability, which is resistant to damage when dropped or handled roughly, which minimizes cost, which preserves the basic nature of the storage phosphor cassette design so that it is compatible with existing storage phosphor readers, and which increases reader equipment reliability while decreasing system downtime due to inoperative cassettes.

BRIEF DESCRIPTION OF THE DRAWINGS

FIG. 3 is a top plan view of the storage phosphor assembly of the cassette of FIG. 1.

FIG. 4 is a side elevational view of the assembly of FIG. 3.

FIGS. 11 and 12 are perspective views of the corners of the cassette of FIG. 1.

FIGS. 13–16 are various views of the insert plate of the assembly of FIG. 3.

DETAILED DESCRIPTION OF THE INVENTION

Figure 1:
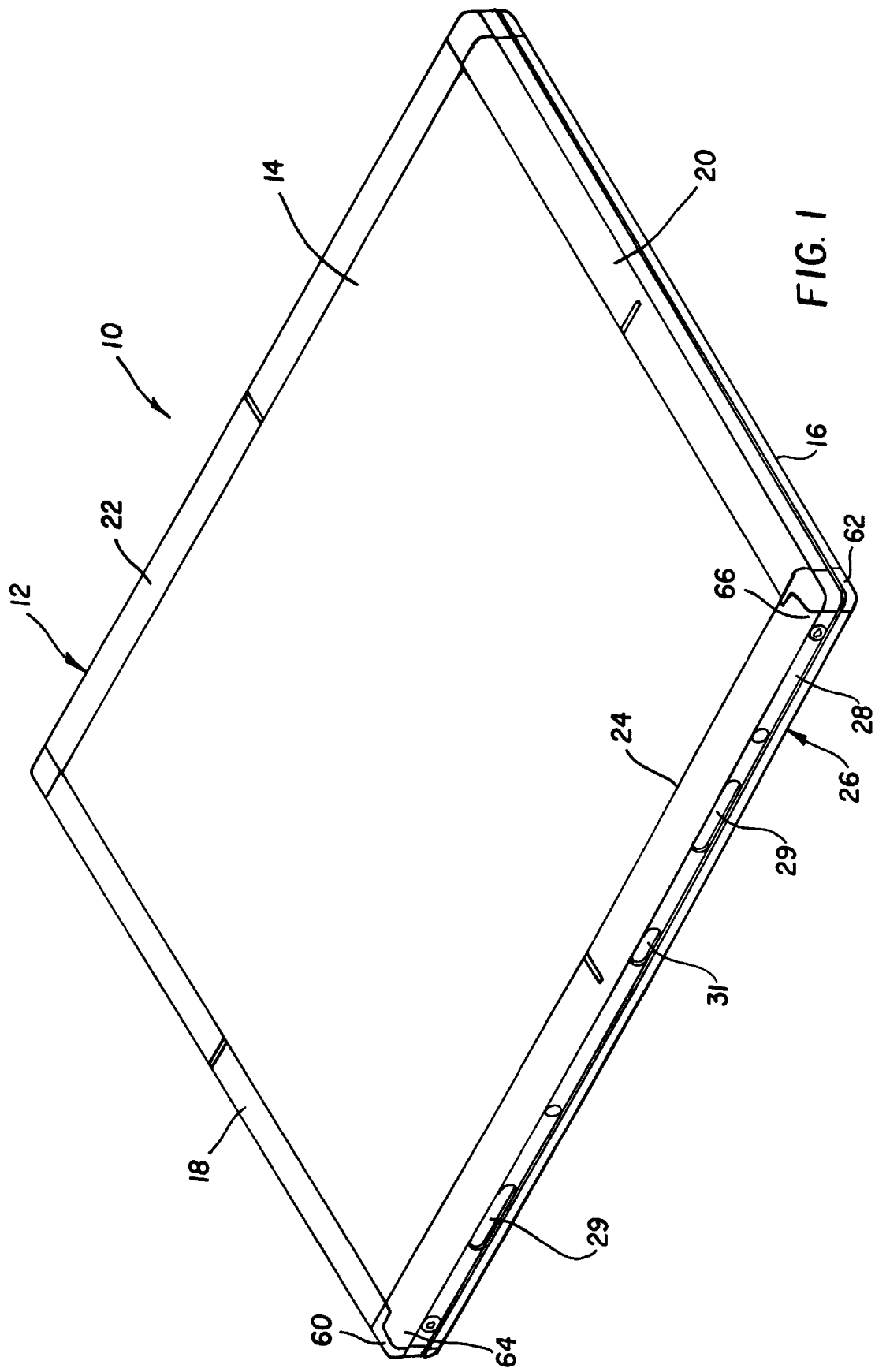
FIG. 1 is perspective view of a storage phosphor cassette according to the present invention.
Figure 2:
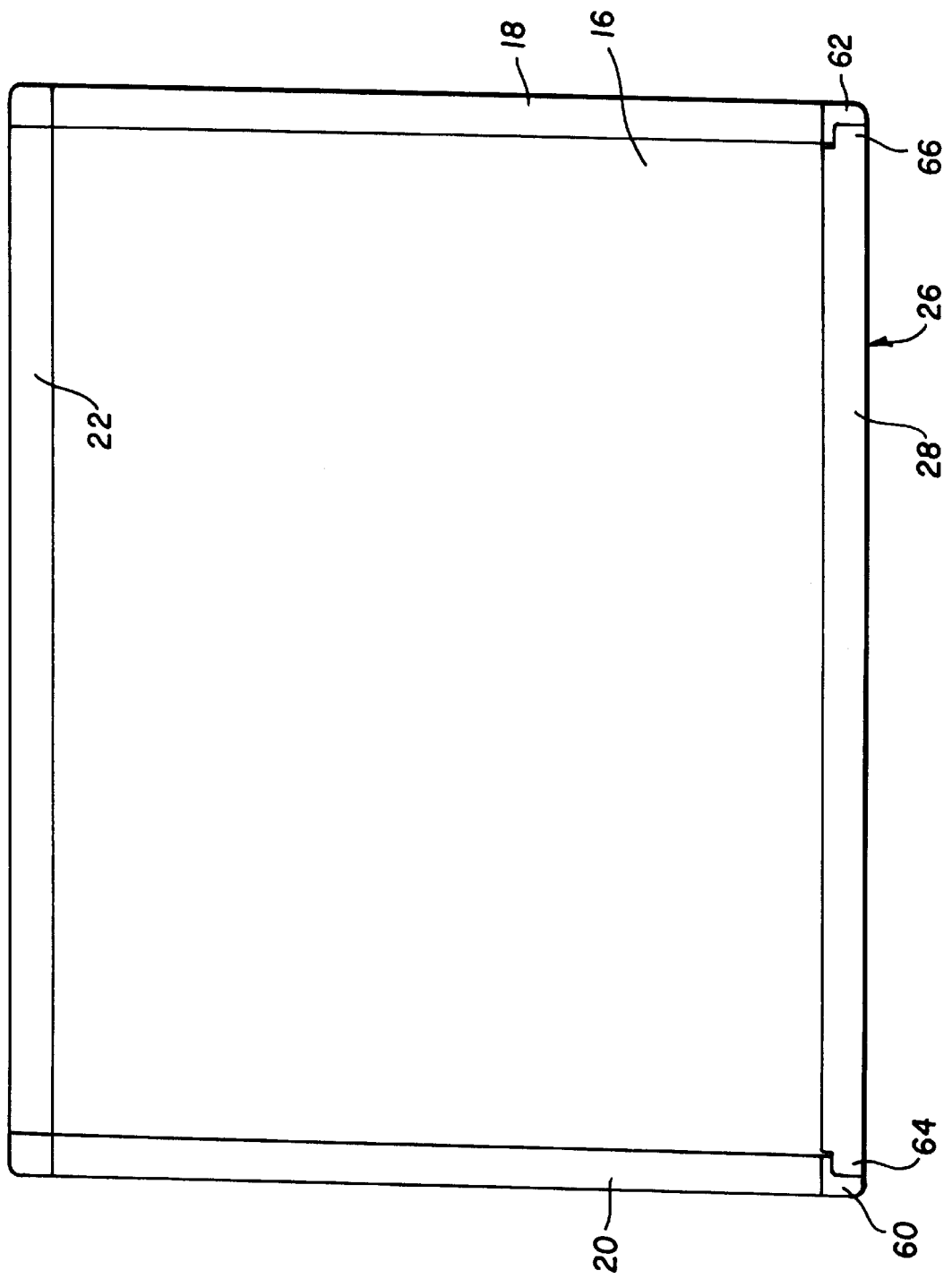
FIG. 2 is a bottom plan view of the cassette of FIG. 1.
Figure 5:
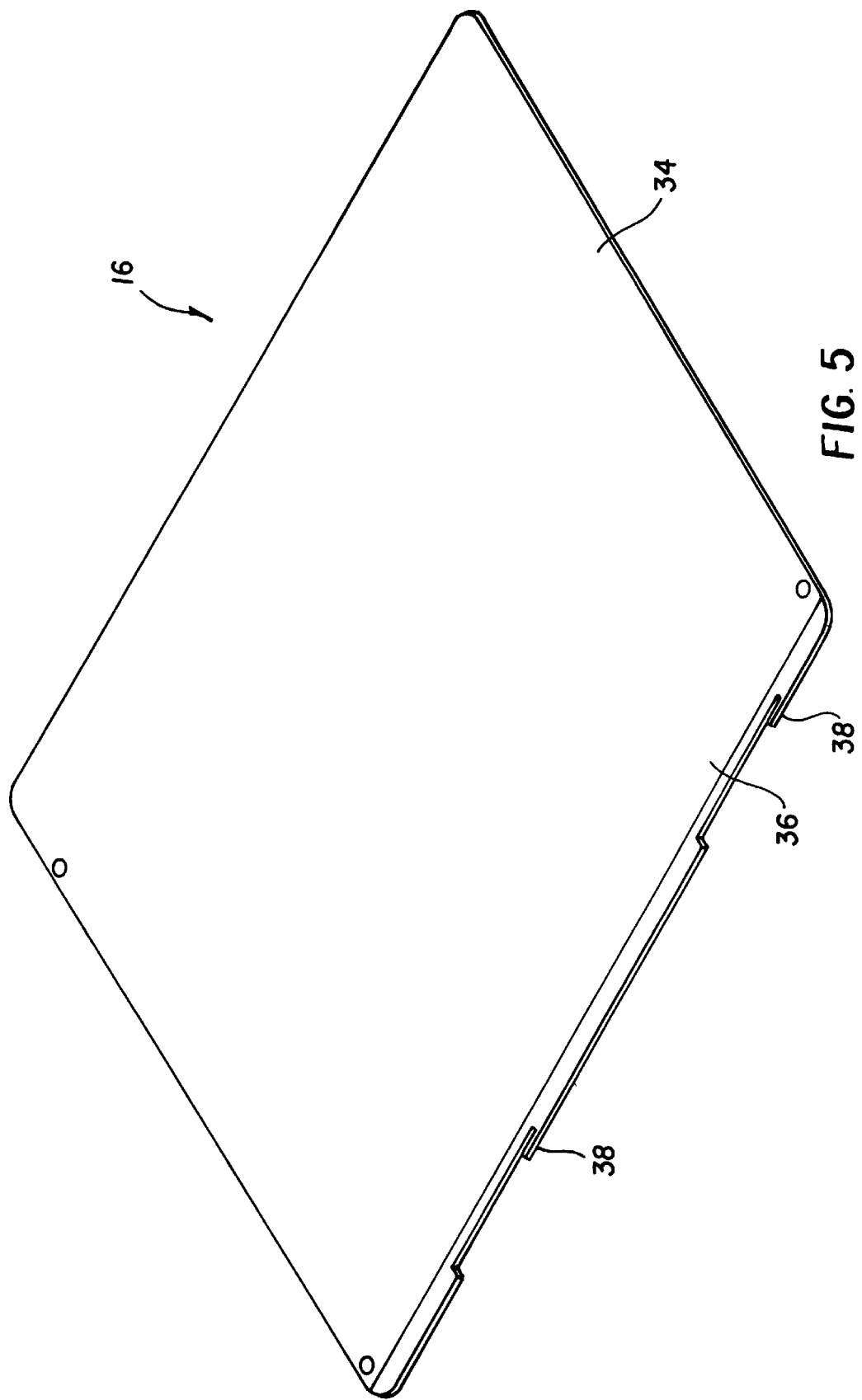
FIGS. 5–9 are various views of the lower panel with latch ears of the cassette shell of FIG. 1.
Figure 6:
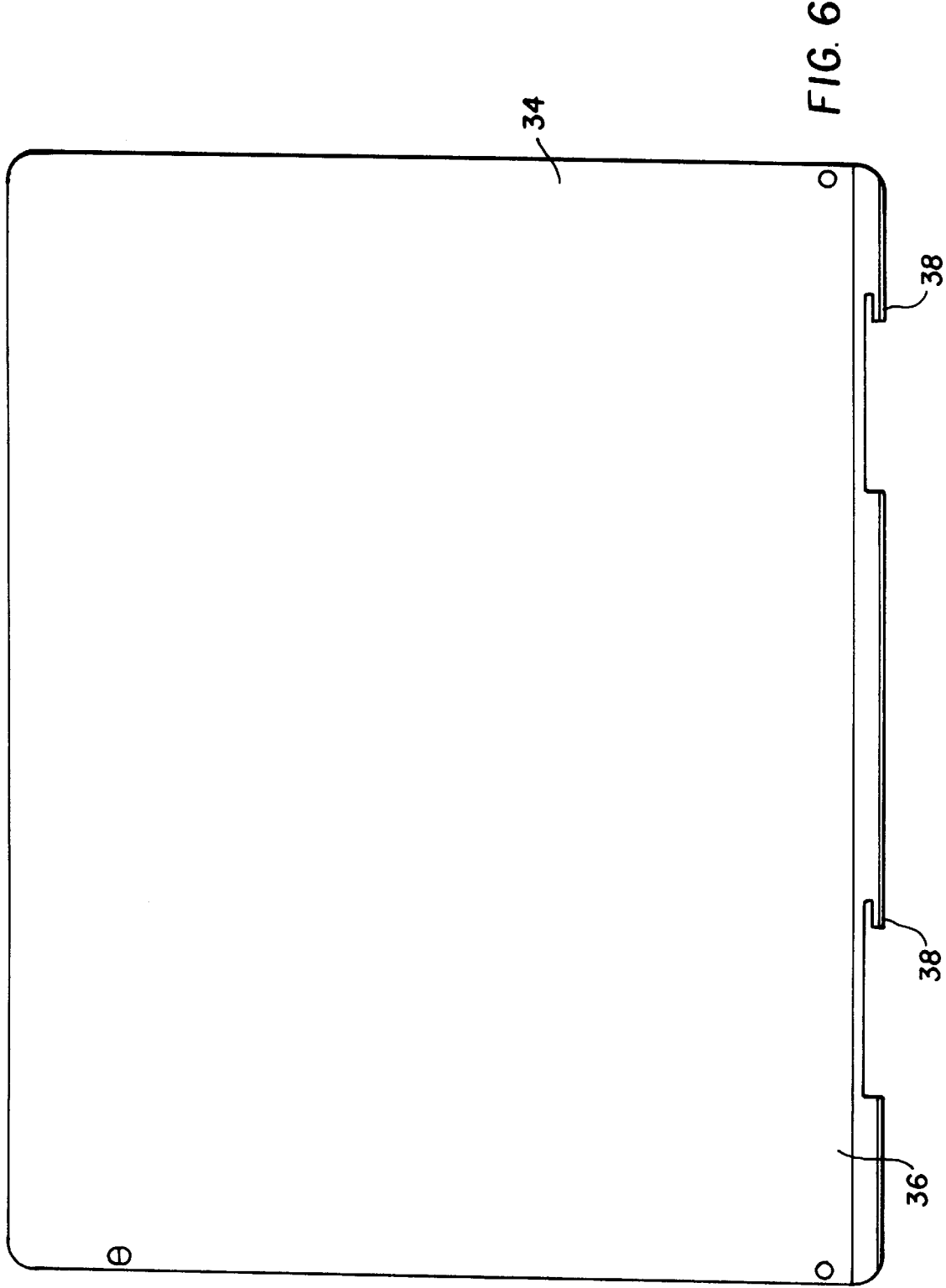

Referring now to the drawings, there will be described the present invention. As shown in FIGS. 1–3, storage phosphor cassette 10 includes a shell 12 including upper and lower rectangular panels 14 and 16, first and second side members 18 and 20, and a front end member 22. Members 18, 20, 22 join panels 14 and 16 to form a five-sided cavity having an open end 24. Cassette 10 also includes a storage phosphor assembly 26 including a back end member 28, an insert plate 30 having an upper face and being cantilevered from said back end member 28 (see FIG. 4). An x-ray storage phosphor 32 is disposed on the upper surface of plate 30. Member 28 includes apertures 29, 31 for access to the interior of member 28 to latch and unlatch a latch bar slidably mounted therein.

Storage phosphor assembly 26 is removably contained in shell 12 such that back end member 28 closes off the open end 24 of shell 12 providing a light tight enclosure for storage phosphor 32.

Figure 7:
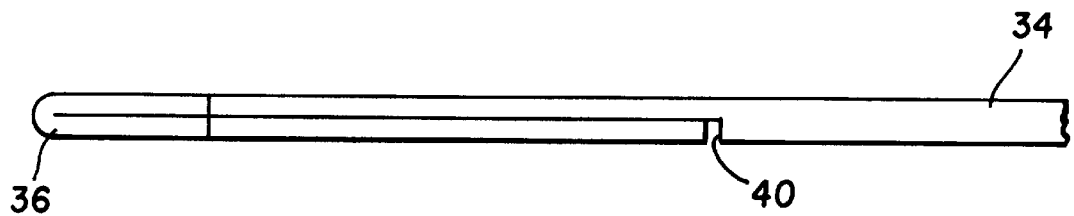
Figure 8:
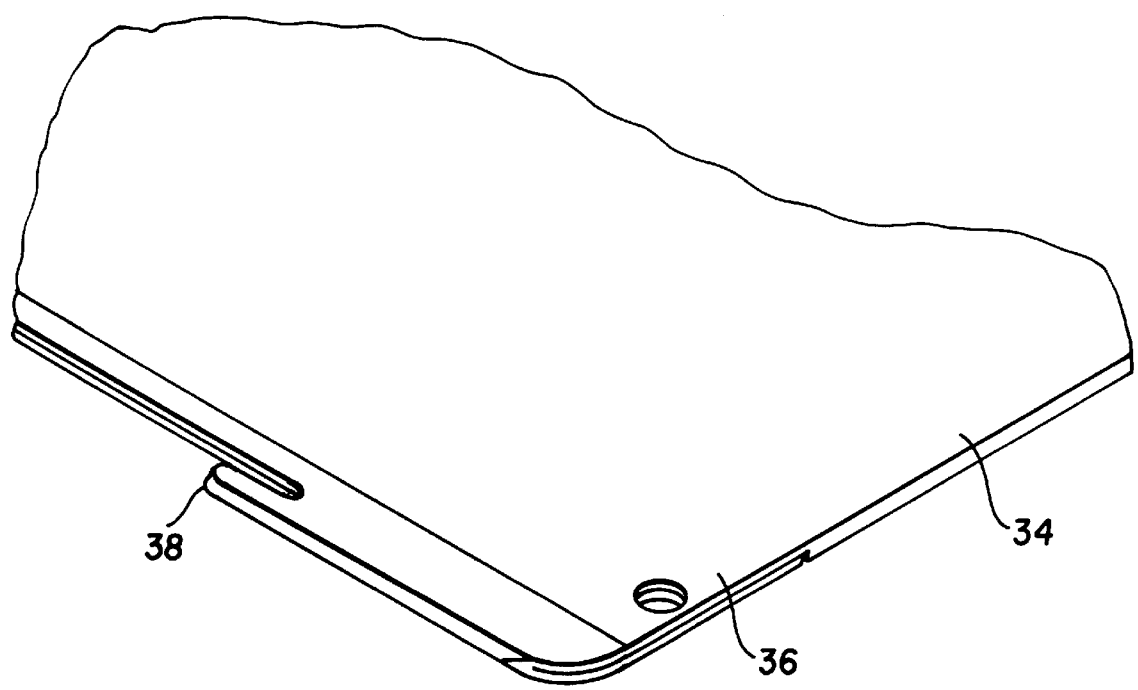
Figure 9:
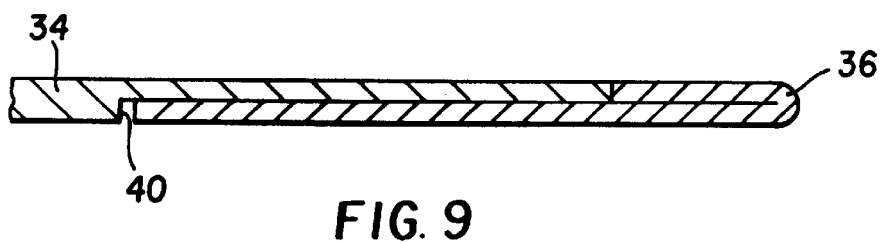

As shown in FIGS. 5–9, lower panel 16 of shell 12 has a front segment 34 of aluminum or other lightweight material, such as composite or plastic, and a latch segment 36 at open end 24 having latch ears 38. Segment 36 is made of stainless steel sheet metal which is folded over on itself and has ears 38 cut or otherwise formed in it. Segment 36 is affixed to segment 34 by screws through screw holes at the ends of segments 34 and 36, and glued or taped across the middle span. As shown in FIGS. 7 and 9, segment 34 is recessed at 40 to receive segment 36. It has been found that folded stainless steel has a yield strength which is 4–6 times that of a single layer of stainless steel. This is due to the "cold working" nature of stainless steel. This design has been shown to be virtually unbendable even in the most severe drop testing. This design is a substantial improvement over forming the lower panel 16 of a single sheet of aluminum out of which locking ears are formed (as in U.S. Pat. No. 5,276,333).

Figure 10:
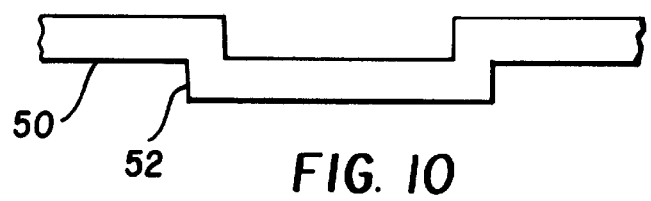
FIG. 10 is a diagrammatic view of a latch bar slidably mounted in the assembly of FIG. 3.
Figure 11:
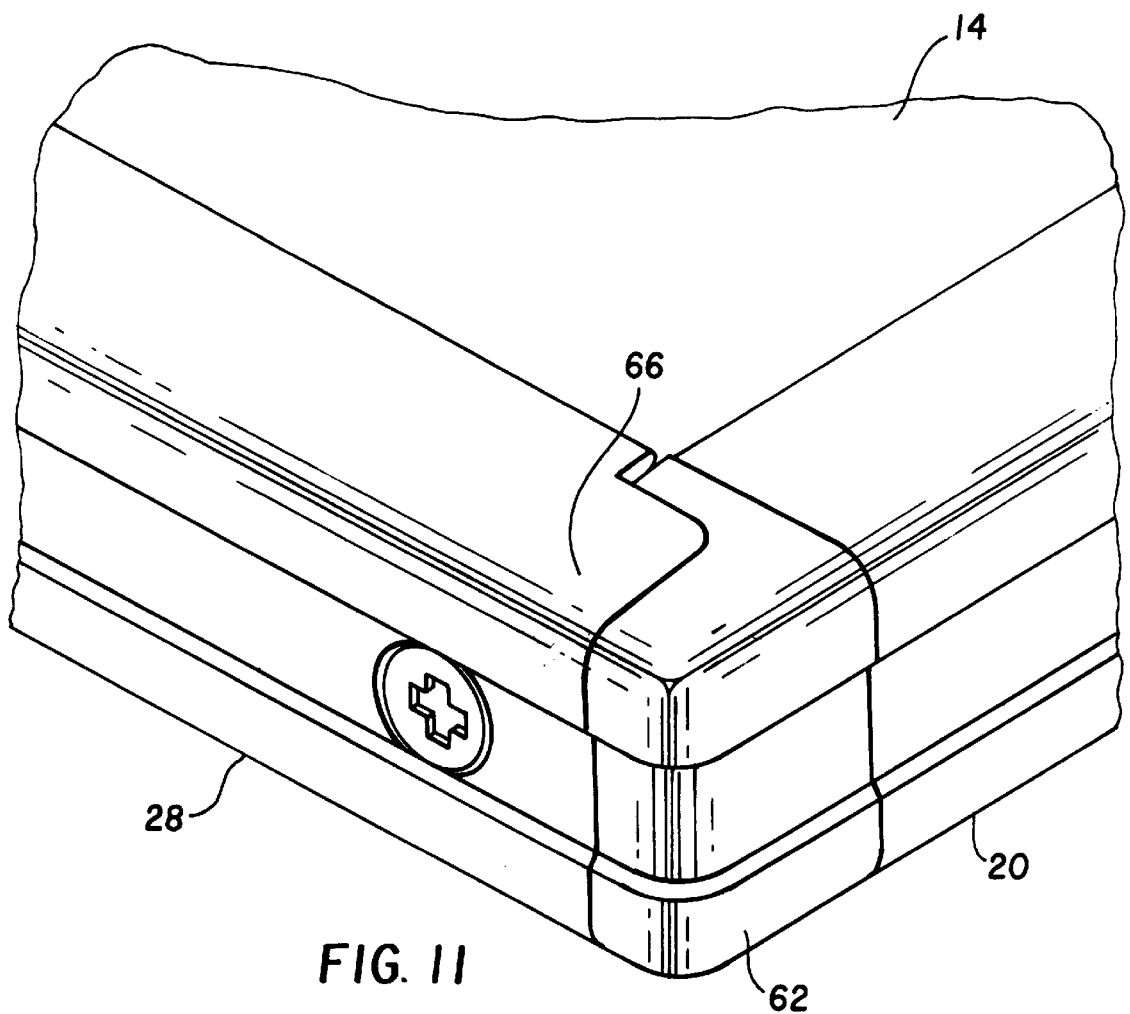

Back end member 28 of insert plate 30 contains a slidable latch bar 50 (FIG. 10) with latch pieces 52 which latch with latch ears 38 of lower panel 16. In order to minimize latch jamming should cassette 10 be dropped on a corner, the interface between shell 12 and assembly 26 is configured to force assembly 26 into shell 12. This configuration is shown in FIGS. 1, 2, 11, and 12. Shell side members 18 and 20, respectively, have corner structure 60 and 62 which respectively engage end portions 64 and 66 of back end member 28 of storage phosphor assembly 26. Corner structure 60, 62 can be integral with members 18, 20, or, as shown, can be separate corner pieces which are secured to member 18, 20.

Ends 64, 66 and respective corner structure 60, 62 have complementary, interlocking, curved L-shaped configurations. If cassette 10 is dropped so that a force is exerted on either corner structure 60, 62, the force is transferred to storage phosphor assembly via friction, forcing assembly 26 into shell 12. The corresponding force on the latch bar 50 by latch ears 38 is such that jamming is prevented.

In order to minimize damage to insert plate 30 if cassette 10 is dropped, plate 30 is configured as shown in FIGS. 3, 4, 13–16. Insert plate 30 (FIG. 16) is a lightweight rigid structure including an aluminum honeycomb core 70 and outer aluminum skins 72, 74. The edge of the honeycomb core 70 is milled out around the entire perimeter to create a cavity in which inserts 76, 78, 80 are glued (FIG. 13). Back end 28 is inserted into the fourth side of the honeycomb structure. Inserts 76 and 80 interlock at their back ends 90, 92 with back end member 28 (FIG. 13) thereby transferring the force of a side impact to the back end member rather than buckling the thin aluminum skins 72, 74. Inserts 76, 80 also extend slightly beyond the perimeter of aluminum skins 72, 74 (as at 94, 96—FIG. 3) thereby creating a bumper system to absorb and distribute forces on insert plate 30. The front end of plate 30 has rounded front corners 98, 100 (FIGS. 3, 15), as well as reduced extension of front edge 102. Side inserts 76, 80 are of aluminum, front insert 78 is of polymeric material, and back end member 28 is of aluminum material.

The invention has been described in detail with particular reference to certain preferred embodiments thereof, but it will be understood that variations and modifications can be effected within the spirit and scope of the invention.

| PARTS LIST | |
|---|---|
| 10 | storage phosphor cassette |
| 12 | shell |
| 14, 16 | upper and lower rectangular panels |
| 18, 20 | first and second side members |
| 22 | front end member |
| 24 | open end |
| 26 | storage phosphor assembly |
| 28 | back end member |
| 29, 31 | apertures |
| 30 | insert plate |
| 32 | storage phosphor |
| 34 | front segment |
| 36 | latch segment |
| 38 | latch ears |
| 40 | recess |
| 50 | slidable latch bar |
| 52 | latch pieces |
| 60, 62 | corner structure |
| 64, 66 | end portions |
| 70 | honeycomb core |
| 72, 74 | outer aluminum skins |
| 76, 78, 80 | inserts |
| 90, 92 | back ends |
| 98, 100 | front corners |
| 102 | front edge |

What is claimed is:

1. A storage phosphor cassette comprising:

a shell including upper and lower rectangular panels, first and second side members, and a front end member, said side members and said front end member joining said upper and lower panels to form a five sided cavity having an open end; wherein said lower panel includes a segment at said open end, said segment having a front edge and formed of folded over stainless steel having latch ears cut into said front edge thereof;

a storage phosphor assembly including a back end member, an insert plate having an upper face and being cantilevered from said back end member, and an x-ray storage phosphor disposed on said upper face of said insert plate, wherein said storage phosphor assembly is removably contained in said shell such that said back end member closes off said open end of said shell;

wherein said insert plate is rectangular with front, back, and side edges , and is formed of a rigid composite having upper and lower aluminum skins and an aluminum honeycomb core, said core having recesses along said front, back, and side edges;

wherein said back end member extends into said back recess, said composite being secured to said back end member;

wherein said insert plate includes side inserts which are secured in said side recesses of said composite, which are interlocked at their back ends with said back end member, and which extend slightly beyond said upper and lower skins of said composite to form a bumper system to absorb and distribute forces away from said composite to said back end member, and further includes a front insert secured in said front recess of said composite.

2. The storage phosphor cassette of claim 1 wherein said side inserts have front corners which are rounded.

3. The storage phosphor cassette of claim 1 wherein said side inserts are aluminum, said front insert is of polymeric material, and said back end member is of aluminum material.

* * * * *